United States Patent
Takano et al.

[11] Patent Number: 5,868,486
[45] Date of Patent: Feb. 9, 1999

[54] SURFACE LIGHT SOURCE DEVICE

[75] Inventors: Yoshinori Takano; Mamoru Yoshida, both of Saitama, Japan

[73] Assignee: Enplas Corporation, Kawaguchi, Japan

[21] Appl. No.: 622,359

[22] Filed: Mar. 27, 1996

[30] Foreign Application Priority Data

Mar. 31, 1995 [JP] Japan ..................................... 7-097612

[51] Int. Cl.$^6$ ........................................................ F21V 8/00
[52] U.S. Cl. ................................................. 362/31; 362/36
[58] Field of Search ................................ 362/26, 31, 341, 362/343, 346, 347, 260, 217

[56] References Cited

U.S. PATENT DOCUMENTS

| 2,308,009 | 1/1943 | Hood et al. | 362/347 |
| 5,392,199 | 2/1995 | Kashima et al. | 362/31 |

FOREIGN PATENT DOCUMENTS

| 2-41328 | 3/1990 | Japan . | |
| 4-126223 | 11/1992 | Japan . | |
| 27327 | 2/1994 | Japan | 362/31 |
| 1539449 | 1/1990 | U.S.S.R. | 362/341 |

*Primary Examiner*—Y. My Quach
*Attorney, Agent, or Firm*—Staas & Halsey

[57] ABSTRACT

A lamp holder 11 is made of white synthetic resin by molding such as injection molding. A reflection sheet 12 made of high-reflectance material such as silver or aluminum has a central portion 12a cut out and is affixed to an inner surface 11a of the lamp holder 11. The light reached the inner surface of the lamp holder 11 of light emitted from a lamp 1 is regularly reflected by the reflection sheet 12 and is diffusively reflected by the cutout portion of the reflection sheet 12. A considerable part of the light reflected on the white surface reaches the vicinity of electrode portions 1a of a discharge tube 1 to enter from an incidence end surface of a light guide in the vicinity of electrode portions 1a. Thus, the difference of light-supplying power between the central portion and the end portions (in the vicinity of the electrode portions 1a) of the lamp is compensated. When the reflection sheet made of a resilient material is used, the reflection sheet can be fixed utilizing the resiliency by putting the reflection sheet along the inner curved surface of the lamp holder. Instead of the reflection sheet, metal (silver or aluminum) may be evaporated on the inner surface of the lamp holder.

11 Claims, 3 Drawing Sheets

SURFACE LIGHT SOURCE DEVICE

BACKGROUND

1. Field of the Invention

The present invention relates to a surface light source device to be applied to a backlighting of a liquid crystal display or the like, and more particularly to a surface light source device having a characterizing feature in a holder for a straight light source (a straight lamp such as a straight discharge tube) for supplying a light guide with light.

2. Related Art

FIGS. 5 and 6 are cross sectional views showing a general structure of a conventional surface light source device. Referring to FIGS. 5 and 6, a surface light source device comprises a straight lamp 1 such as a cold cathode tube, a light guide 2, a diffusive member 3 disposed on an emitting side of the light guide 2, and a reflection member 4 such as a reflection sheet disposed on a side of the light guide 2, which is opposite to the side at which the diffusive member is disposed. The straight lamp 1 is surrounded from its rear side by a lamp holder 11 having a reflection surface inside.

Generally, a discharge tube such as a cold cathode tube is adopted as a straight lamp for use in this type of surface light source device. The discharge tube such as a cold cathode tube has an electrode portion 1a at each of opposite ends thereof, as shown in FIG. 6, and therefore a power of light supply to an incidence end surface 2a of the light guide 2 in the vicinity of the electrode portions 1a is relatively low as compared with the central portion. As a result, an uneven luminance is caused in an emitting surface 2b of the light guide 2.

In an ordinary cold cathode tube, luminance sharply drops in the range of approximately 15% of the full length from the tube ends. FIG. 7 is a graph for showing the drop of luminance, in which the horizontal axis represents a longitudinal position in the tube and the vertical axis represents luminance (nt) of the emitting surface 2b. The origin of the horizontal axis corresponds to one of the opposite ends of the tube. As shown in this graph, in general, luminance sharply drops at positions spaced apart from the opposite ends of the tube by a distance 10–20% of the full length towards the opposite ends and is substantially constant in both portions around the center, each portion occupying approximately 35% of the full length (approximately 70% in total).

As a solution for eliminating the difference of the light-supplying power between the end portions and the central portion, there is known a method of realizing a uniform intensity of the light emitted from the discharge tube by attaching a shading material or a light reflective material to a part of the surface of the discharge tube.

However, according to the above conventional method, as the light emitted from the central portion, which is inherently bright, is suppressed, the total luminance is reduced. Further, as the light reflected by the inner surface of the lamp holder is shielded by the shading material or reflective material attached to the surface of the discharge tube, the efficiency of utilizing the light would be lowered.

Another problem with the conventional method is that the shading material or reflective material pasted on the tube surface tends to be deteriorated or peeled by the heat generated by the discharge tube.

Still another problem is that the luminance of the emitting surface 2b in the vicinity of the side surface 2d tends to be further lowered by the following causes.

A part of the light entered and transmitted in the light guide 2 comes out of the light guide 2 from the side surface 2d. This phenomenon decreases the light emitted from the emitting surface 2b of the light guide 2 in the vicinity of the side surface 2d. The phenomenon results in further drop of luminance of the emitting surface 2b in the vicinity of the side surface 2d when combined with the insufficient light-supplying power in the vicinity of the electrode portions 1a of the straight lamp (discharge tube) 1, as mentioned.

If the side surface 2d of the light guide 2 is made a reflection surface in order to eliminate the leak of light from the side surface 2d, the manufacturing cost of the light guide would increase.

From another point of view, the light guide is usually molded of synthetic resin by an injection molding. In the molding, a gate for pouring resin may be located at the incidence end surface. If the gate is located in such a position, a vestige of a cut-out gate is left in the central portion of the incidence end surface 2a. In the presence of the gate vestige in the central portion of the incidence end surface of the light guide, the light taken from the gate vestige into the guide light is diffused there so that the greater part of the incident light is emitted from the emitting surface 2b immediately near the incidence position.

As a result, the light emitted from the central portion of the incidence end surface 2a becomes relatively intense, thus causing the luminance unevenness.

OBJECT AND SUMMARY OF INVENTION

An object of the present invention is to solve the foregoing problems in the conventional art. A surface light source device according to the present invention comprises: a straight lamp; a light guide having an incidence end surface disposed in the vicinity of the straight lamp; a reflection member disposed on a side opposite to an exiting surface of the light guide; and an improved lamp holder covering the straight lamp.

The improved lamp holder comprises a reflection surface for reflecting the light emitted from the straight lamp, which has a diffusive reflection surface at the central portion of an inner surface thereof and a regular reflection surface of high reflectance at the remaining portion of the inner surface.

With the above improvement of the lamp holder, the reflection surface reflects the light emitted from the straight lamp to enter the light guide from the incidence end surface, so that the difference of the incidence light quantity can be reduced between the central portion and the opposite ends of the incidence end surface of the light guide, keeping the incidence efficiency in high level.

Specifically, the diffusively reflected light at the central portion of the reflection surface of the lamp holder is introduced into the light guide not only from the central portion of the incidence end surface but also from portion in the vicinity of the electrode portion of the discharge tube. In contrast, as a diffusively reflection function is not given to the regular reflection surface (a portion except the central portion), small percentage of light reflected by the regular reflection surface escapes to the central portion of the light reflected by the regular reflection surface. Namely, the light emitted from the discharge tube is usually diffused light; however, as the lamp holder, the discharge tube and the incidence end surface of the light guide are disposed adjacent to one another, the light emitted from the discharge tube scarcely enter directly from a far portion of the incidence end surface, and the light reflected by the regular reflection surface of the lamp holder is hardly diffused widely towards the incidence end surface of the light guide.

Consequently, a considerable quantity of light runs from the central portion to the opposite ends so that the quantity of the light entered from the incidence end surface in the vicinity of the electrodes relatively increases as a whole, thus eliminating the insufficient quantity of light entered from the incidence end surface in the vicinity of the electrodes.

For the foregoing reasons, according to the surface light source device of the present invention, the light entered in the vicinity of the electrode portions of the light source (near side surfaces of the light guide) is increased without reducing the entire quantity of light entered from the incidence end surface of the light guide, so that uniform light supply is realized over the entire incidence end surface.

The diffusive reflection surface can be formed only at the central portion on the inner surface of the lamp holder in the following ways.

First, a lamp holder made of white synthetic resin to be entirely white, or a lamp holder having a white color only on its inner surface is prepared. Then, silver or aluminum sheets are attached to the inside surface of the lamp holder one at each of opposite side spaced apart from each other at the central portion. Alternatively, a single silver or aluminum sheet having a central portion cut out may be used. In another alternative way, a metal layer is formed on the inner surface of the lamp holder except the central portion by metal evaporation or the like to provide a regular reflection surface.

In another example of the lamp holder to be used in the present invention, a single transferred film having a white surface at the central portion and regular reflection surfaces of silver or aluminum, etc. at opposite sides thereof is disposed on the inner surface of the lamp holder.

In still another example of the lamp holder to be used in the present invention, a white surface is formed on the central portion of a reflection sheet made of a material having a regular-reflection function, such as silver or aluminum, and such reflection sheet is disposed on the inner surface of the lamp holder.

In a further example of lamp holder to be used in the present invention, the lamp holder is made of a material having a regular-reflection function, and the central portion of the inner surface is processed to be white.

According to another alternative method other than the foregoing ways, either a regular-reflection function or a diffusive-reflection function is given to the reflection surface for reflecting the light emitted from the straight lamp to the incidence end surface of the light guide, and a different reflectance is given to the central portion and the remaining portion. This method may cause a slight drop in the efficiency of utilizing the light emitted from the straight lamp.

Namely, the quantity of light to enter the light guide from the central portion of the incidence end surface is restricted by reducing reflectance of the central portion of the reflection surface and the drop of quantity of the light to enter the light guide from the incidence end surface except the central portion is prevented by relatively increasing reflectance at the opposite sides, thus achieving a uniform luminance distribution of the light from the emitting surface of the light guide.

For example, an aluminum sheet is arranged at the central portion of the inner surface of the lamp holder, while a silver sheet is disposed at the remaining portion. Alternatively, the central portion may be a white surface having not so high reflectance, while the remaining portion may be a whitish surface having relatively high reflectance.

The present invention will be described in greater detail referring to the accompanying drawings.

PREFERRED EMBODIMENTS

Figure 5:
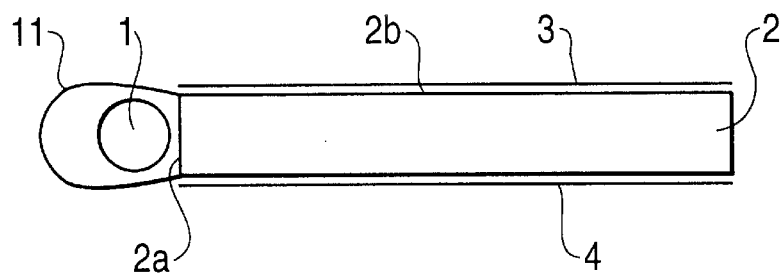
FIG. 5 is a cross sectional view showing a general structure of a conventional surface light source device.
Figure 6:
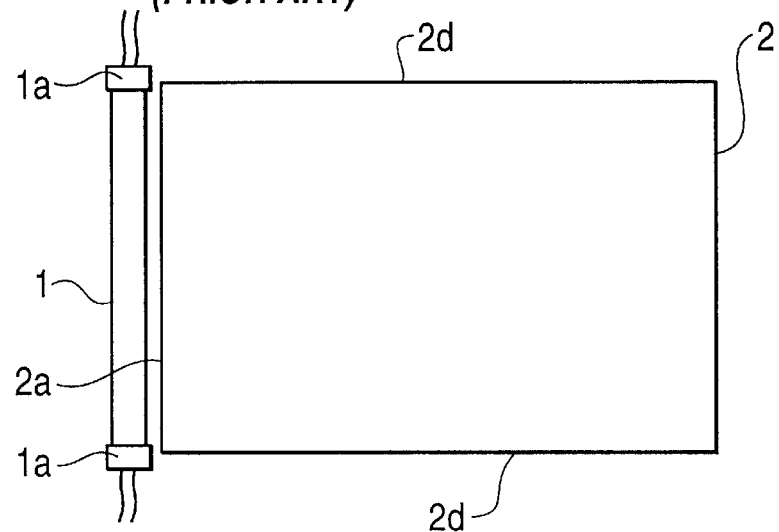
FIG. 6 is a plan view showing the conventional surface light source device.
Figure 7:
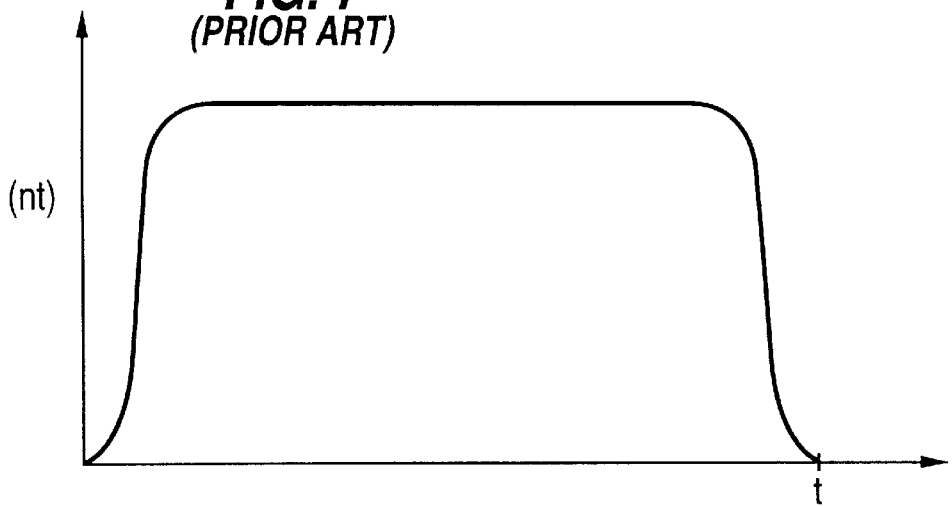
FIG. 7 is a graph showing luminance distribution of an emitting surface of the conventional surface light source device.

In each of the following embodiments, the general structure of a surface light source device is similar to that shown in FIGS. 5 and 6 except an arrangement of a lamp holder. Thus, the illustration of each embodiment is made only on the lamp holder, and the description will be made focusing on the lamp holder.

Figure 1:
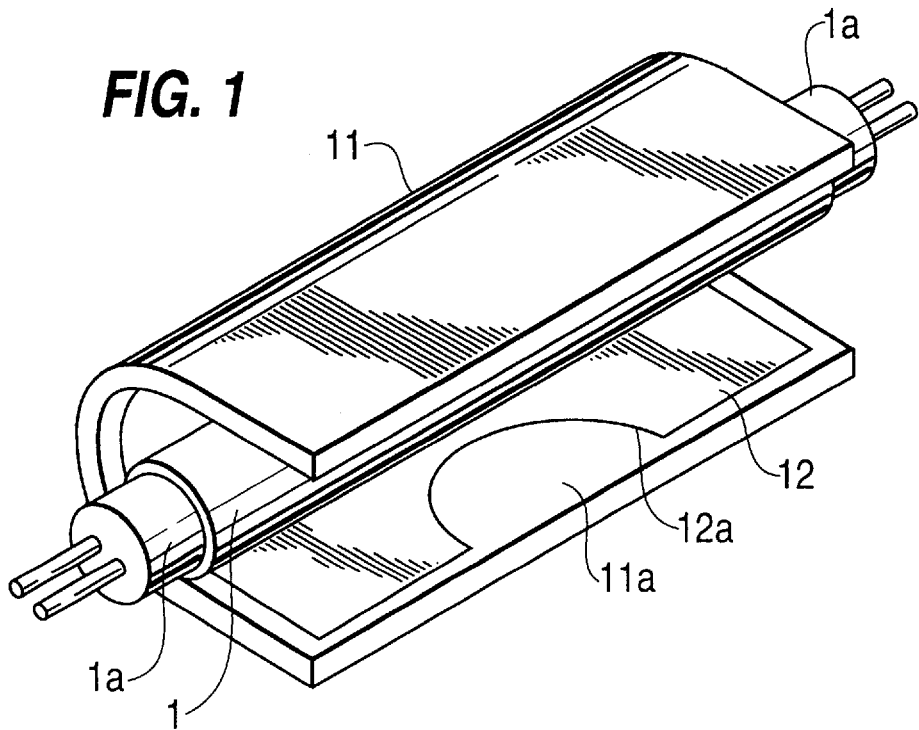
FIG. 1 is a schematic view showing a structure of a lamp holder according to a first embodiment of the present invention.

FIG. 1 is a schematic view showing a first embodiment. Referring to FIG. 1, a lamp holder 11 is made of white synthetic resin and molded such as by injection molding. A reflection sheet 12, made of material having a high reflectance such as silver or aluminum, has a central portion 12a cut out and is affixed to an inner surface 11a of the lamp holder 11.

The portion on which the reflection sheet 12 is affixed has a high reflectance, while the cut-out portion is diffusively reflective as the inner surface 11a of the white lamp holder 11 is exposed. The light arriving at the inner surface of the lamp holder 11 of the light emitted from the lamp 1, is regularly reflected by the portion to which the reflection sheet 12 is affixed and is diffusively reflected by the cut-out portion of the reflection sheet 12.

A considerable part of the light reflected on the white surface reaches the vicinity of the electrode portions 1a of the discharge tube 1 and enters an incidence end surface of a light guide. Thus, the difference between the light-supplying power at the central portion and that at the opposite ends (in the vicinity of the electrode portions 1a) of the lamp is compensated.

When a resilient reflection sheet is used, the reflection sheet can be fixed utilizing its resiliency by putting the reflection sheet along the inner curved surface of the lamp holder. Instead of the reflection sheet, metal (silver or aluminum) may be evaporated on the inner surface of the lamp holder.

In this first embodiment, the whole lamp holder 11 may be made of a resin having a different color other than white, and only the inner surface thereof may be colored in white. In this case, the degree of freedom in selecting materials is made higher and the selection of materials taking account of toughness and heat-resistance thereof is allowed.

Figure 2:
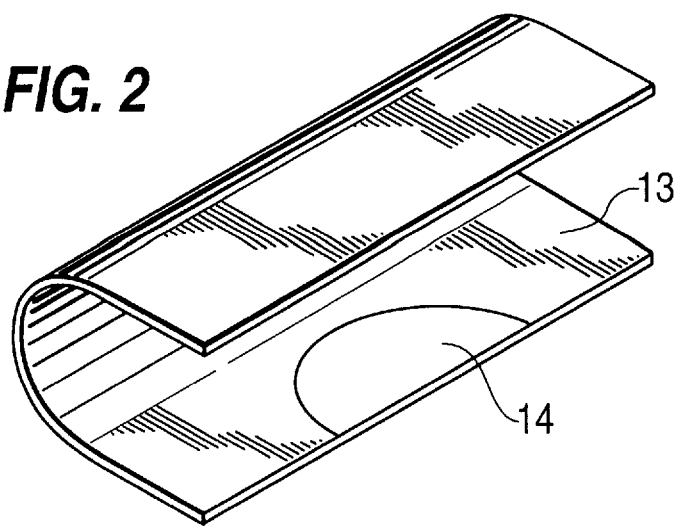
FIG. 2 is a schematic view showing a reflection sheet to be arranged on an inner surface of a lamp holder according to a second embodiment of the invention.

FIG. 2 is a schematic view showing a second embodiment of the present invention. Referring to FIG. 2, a white surface 14 is provided on a part of a reflection sheet 13 made of silver or aluminum, etc. The reflection sheet 13 is inserted into and affixed to a lamp holder (the inner surface thereof need not be white in color) which has a shape as shown in FIG. 1.

In this case, when a resilient reflection sheet 13 is used, the reflection sheet 13 can be fixed utilizing its resiliency in the same manner as in the first embodiment.

Also in this second embodiment, the same result as that of the first embodiment is expected with the reflection by the reflection sheet 13 and the diffusive reflection by the white surface 14.

Figure 3:
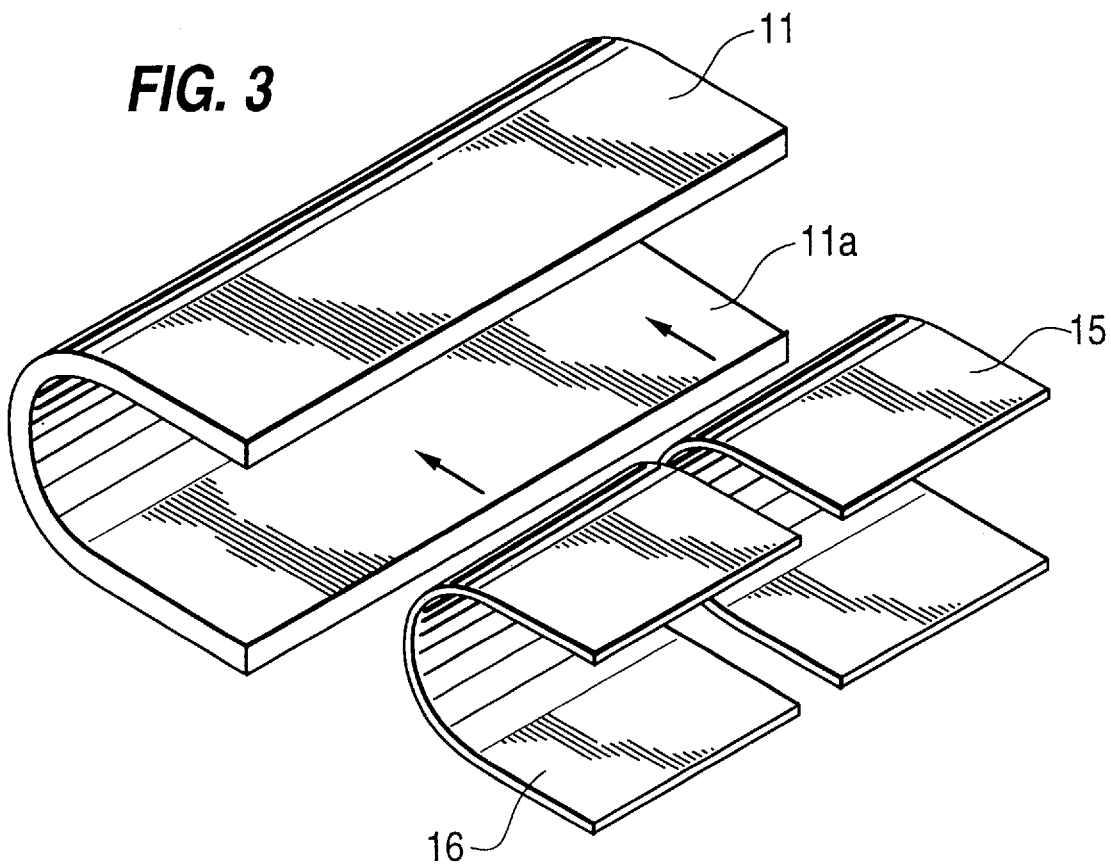
FIG. 3 is a schematic view showing a structure of a lamp holder according to a third embodiment of the invention.

FIG. 3 is a schematic view showing a third embodiment of the present invention. Referring to FIG. 3, two reflection sheets 15 and 16 which are made of silver or aluminum, etc. are affixed to an inner surface 11a of a lamp holder 11 which is made of white synthetic resin so that they are slightly spaced apart from each other at the center. The reflection sheets 15 and 16 serve as reflection surfaces, while the spaced apart portion serves as a diffusive reflection surface and the same effect as those of the first and second embodiments is expected.

Also in the third embodiment, when the two reflection sheets are made resilient, they may be simply inserted without adhesion.

Figure 4:
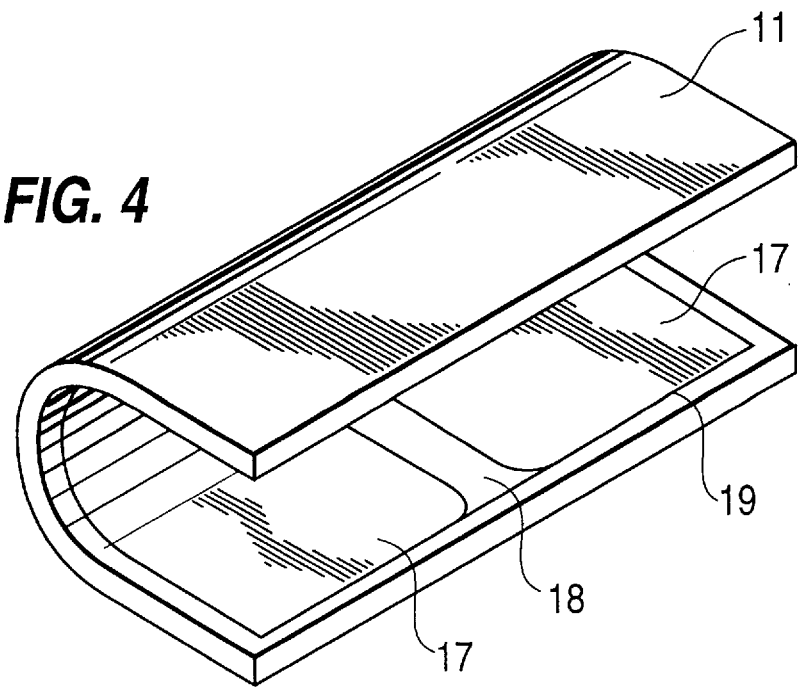
FIG. 4 is a schematic view showing a structure of a lamp holder according to a fourth embodiment of the invention.

FIG. 4 is a schematic view showing a fourth embodiment of the present invention. Referring to FIG. 4, a single transferred sheet 19, having a reflection surface of silver or aluminum, etc and a white surface 18, is affixed to the inner surface of the lamp holder 11. Also in this embodiment, the same effect as in the foregoing embodiments is obtained based on the difference of reflection characteristic between the reflection surface 17 and the white surface 18.

Further, a reflection sheet for use in the surface light source device of the present invention is obtained by making a lamp holder of a material having a high reflectance and then processing the central portion of the inner surface thereof to be white.

Alternatively, the lamp holder may be made of white synthetic resin generally used in the art, and the inner surface of the lamp holder except the central portion may be covered with a reflection sheet having a whitish color and a high reflectance. An aluminum sheet may be arranged at the central portion on the inner surface of the lamp holder, and a silver sheet may be arranged on the inner surface except the central portion.

Other alternative method other than the above-mentioned ways is exemplified by evaporating a plurality of kinds of metals having different reflectance on the inner surface of the lamp holder, and arranging a plurality of kinds of whitish reflection sheets having different reflectance on the inner surface of the lamp holder. Further, a plurality of white surfaces having different reflectance may be formed on a single sheet, and thus obtained sheet may be placed on the inner surface of the lamp holder.

With the above arrangement, the diffusion of the light entered into the light guide plate from the incidence end surface is substantially even in the central portion and in both side thereof.

According to the above method, the reflecting action of the inner surface of the lamp holder is either regular reflection or diffusive reflection, and therefore the light entered into the light guide from the incidence end surface is such that the central portion is different from the remaining portion in quantity of the light but substantially the same in diffusing state of the light, thus preventing luminance unevenness due to the difference in diffusing state of the light entered into the light guide.

With the surface light source device of the present invention as described with the foregoing embodiments, even if a vestige of the molding gate is remains at the center of the incidence end surface, the quantity of the light entered from the gate vestige can be reduced by adjusting the size and shape of the diffusive surface in the inner surface of the lamp holder so that excessive brightness of the emitting surface in the vicinity of the vestige of the cut-out gate can be prevented.

Furthermore, in a case where a sheet is arranged on the inner surface of the synthetic resin lamp holder in the above embodiments, the sheet may be affixed to the inner surface when molding the lamp holder utilizing a so-called insert method.

As described above in detail, the surface light source device of the present invention is capable of preventing a drop of quantity of light in the vicinity of an electrode portions without lowering the total quantity of the light to enter a light guide from an incidence end surface (without lowering the utility efficiency), by providing a portion having a diffusive-reflection function at the central portion of a reflection surface for reflecting the emitted light from a straight lamp towards an incidence end surface of a light guide, thus realizing a uniform luminance distribution over the entire emitting surface of the light guide.

Further, when the reflection surface for reflecting the emitted light from the straight lamp to the incidence end surface of the light guide is designed to be restricted to either a regular reflection function or a diffusive reflection function, and only the reflectance is varied between the central portion and the remaining portion, more uniform distribution over the entire emitting surface of the light guide is realized although a small drop of the utility efficiency of light is caused.

What is claimed is:

1. A surface light source device comprising:

a straight lamp having a central portion and opposite end portions;

a light guide having a light emitting surface, and an incidence end surface disposed in confronting relation to said straight lamp;

a reflection member disposed on a side opposite to said light emitting surface of said light guide; and a lamp holder covering said straight lamp to reflect the light emitted from said straight lamp to said incidence end surface of said light guide, and having a diffusive reflection surface at a central portion of an inner surface of said lamp holder, and a regular reflection surface having high reflectance at portions outside of the central portion of the inner surface, said diffusive reflection surface being disposed in confronting relation to said central portion of said straight lamp and said regular reflection surface being disposed in confronting relation to said opposite end portions of said straight lamp so as to compensate a difference of luminance of said light guide between a region of said light emitting surface near said central portion of said straight lamp and regions of said light emitting surface near said opposite end portions of said straight lamp.

2. A surface light source device according to claim 1, wherein said diffusive reflection surface is white in color, and said regular reflection surface of high reflectance comprises a metal sheet.

3. A surface light source device according to claim 1, wherein said diffusive reflection surface is white in color, and said regular reflection surface of high reflectance comprises a metal evaporation sheet.

4. A surface light source device according to claim 1, wherein said diffusive reflection surface is white in color and said regular reflection surfaces of high reflectance comprises one of a silver and aluminum sheet.

5. A surface light source device according to claim 1, wherein said diffusive refection surface is white in color, and said regular reflection surface of high reflectance comprises one of a silver and aluminum evaporation sheet.

6. A surface light source device according to claim 1, wherein said lamp holder is white in color and a portion of said inner surface of said lamp holder except for said central portion is covered by a metal layer so that said portion of said inner surface covered by said metal layer forms said regular reflection surface of high reflectance and said central portion not covered by said metal layer forms said diffusive reflection surface.

7. A surface light source device according to claim 1, wherein said lamp holder is white in color and a portion of said inner surface of said lamp holder except for said central portion is covered by one of a silver and aluminum layer so that said portion of said inner surface covered by said layer forms said regular reflection surface of height reflectance and said central portion not covered by said layer forms said diffusive reflection surface.

8. A surface light source device according to claim 1, wherein said diffusive reflection surface and said regular reflection surface of high reflectance are formed on a single sheet which is disposed on said inner surface of said lamp holder.

9. A surface light source device according to claim 1, wherein said lamp holder has a regular reflection function with high reflectance, and said central portion of said inner surface of said lamp holder is processed to be white in color so that said processed portion forms said diffusive reflection surface and a non-processed inner surface portion forms said regular reflection surface of high reflectance.

10. A surface light source device comprising:

a straight lamp having a central portion and opposite end portions;

a light guide having a light emitting surface, and an incidence end surface disposed in confronting relation to said straight lamp;

a reflection member disposed on a side opposite to said light emitting surface of said light guide; and a lamp holder covering said straight lamp for reflecting the light emitted from said straight lamp to said incidence end surface of said light guide, and having a first reflection surface at a central portion of an inner surface of said lamp holder and a second reflection surface at portions outside of the central portion of the inner surface, said first reflection surface being disposed in confronting relation to said central portion of said straight lamp and said second reflection surface being disposed in confronting relation to said opposite end portions of said straight lamp, wherein said first reflection surface and said second reflection surface of said lamp holder have the same light reflecting function, but said first reflection surface has a lower reflectance than that of said second reflection surface, so as to compensate a difference of luminance of said light guide between a region of said light emitting surface near said central portion of said straight lamp and regions of said light emitting surface near said opposite end portions of said straight lamp.

11. A surface light source device according to claim 10, wherein said lamp holder is made of white synthetic resin, and an inner surface of said lamp holder except for said central portion is covered by a whitish reflection sheet having reflectance higher than that of said white synthetic resin so that said inner surface of said lamp holder forms said second reflection surface.

* * * * *